United States Patent [19]

Dranginis

[11] Patent Number: 4,480,291

[45] Date of Patent: Oct. 30, 1984

[54] HEADLIGHTS FOR STREAMLINED VEHICLES

[76] Inventor: William M. Dranginis, 7915 Carrie La., Manassas, Va. 22110

[21] Appl. No.: 532,004

[22] Filed: Sep. 14, 1983

[51] Int. Cl.³ .............................................. B60Q 1/00
[52] U.S. Cl. ...................................... 362/80; 362/83; 362/279; 362/290; 362/342; 362/365
[58] Field of Search ................. 362/80, 290, 342, 354, 362/279, 64, 83, 365

[56] References Cited

U.S. PATENT DOCUMENTS

| | | | |
|---|---|---|---|
| 1,457,630 | 6/1923 | Johnson | 362/290 |
| 1,598,106 | 8/1926 | Schoonmaker | 362/346 X |
| 2,065,814 | 12/1936 | Lennon | 362/290 |
| 2,102,928 | 12/1937 | Van Leunen | 362/290 |
| 2,119,370 | 5/1938 | Van Leunen | 362/290 |
| 3,275,820 | 9/1966 | Szarkowski | 362/290 |
| 3,604,922 | 9/1971 | Steel | 362/279 X |
| 3,736,416 | 5/1973 | Goodwin | 362/279 X |
| 4,049,309 | 9/1977 | Seal | 362/65 X |
| 4,241,392 | 12/1980 | Boone | 362/342 |
| 4,383,290 | 5/1983 | Binder et al. | 362/290 |

FOREIGN PATENT DOCUMENTS 428791  5/1935  United Kingdom ............... 362/290

*Primary Examiner*—Peter A. Nelson
*Attorney, Agent, or Firm*—Brady, O'Boyle & Gates

[57] ABSTRACT

To minimize wind resistance in streamlined vehicles, headlights are mounted at a fixed angle with their frontal lenses flush and parallel to the sloping body surface. Light is reflected at the required angle and intensity onto the roadway by a system of reflective spaced slats positioned near and rearwardly of the headlight lens and well forwardly of the parabolic headlight reflector. The reflective slats may be contained in a fabricated assembly or may be embodied in a unitized molded structure. The system is compatible with incandescent and halogen light sources and with standard adjustable headlight mounting structures on vehicles.

15 Claims, 9 Drawing Figures

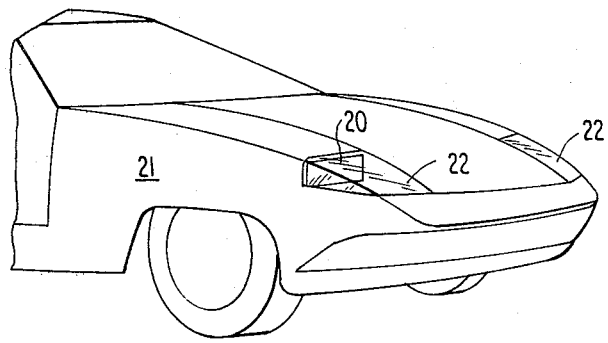
FIG.1 PRIOR ART
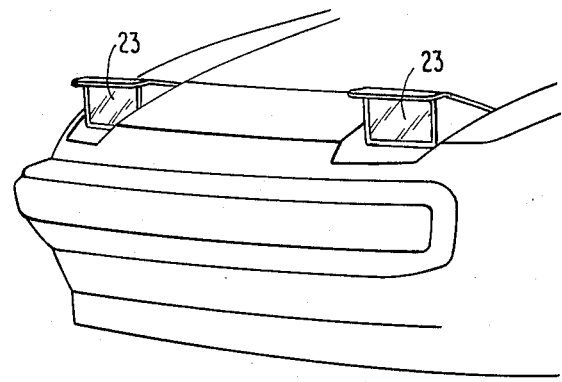
FIG.2 PRIOR ART
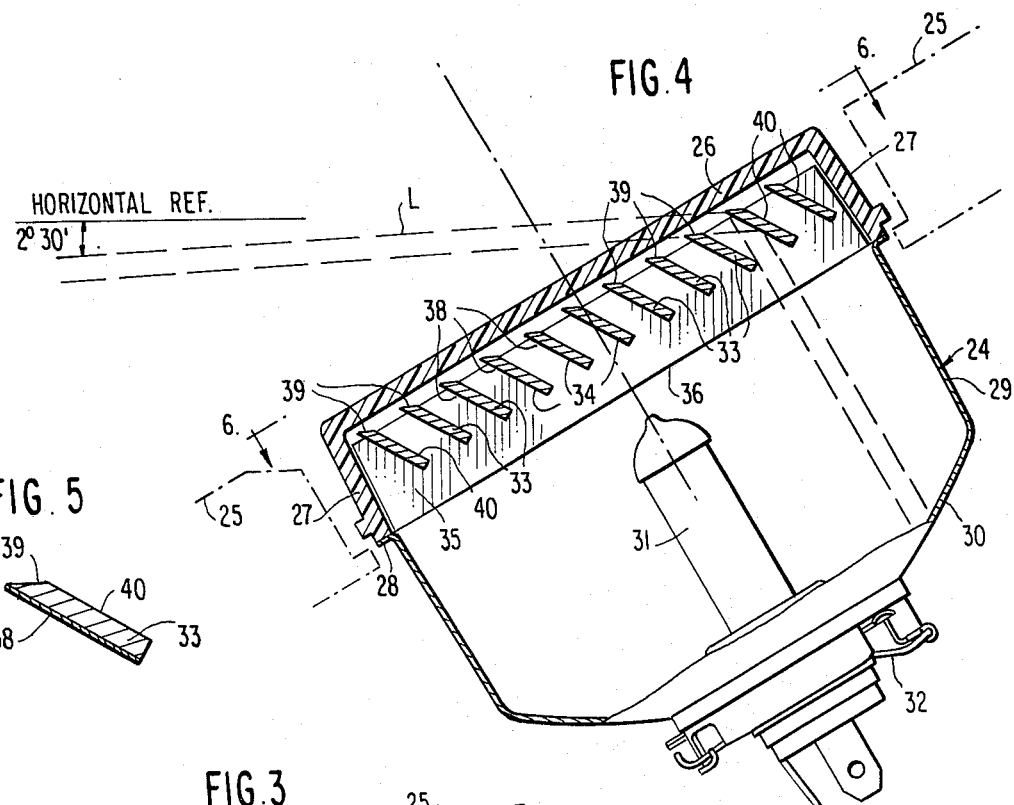
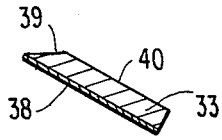
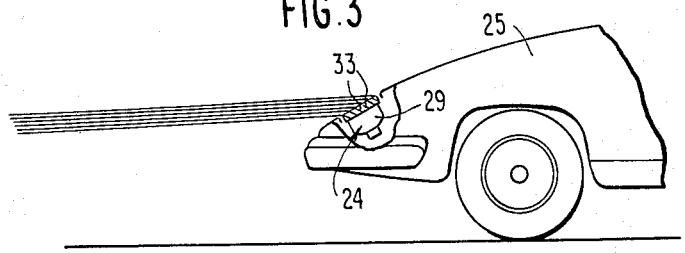

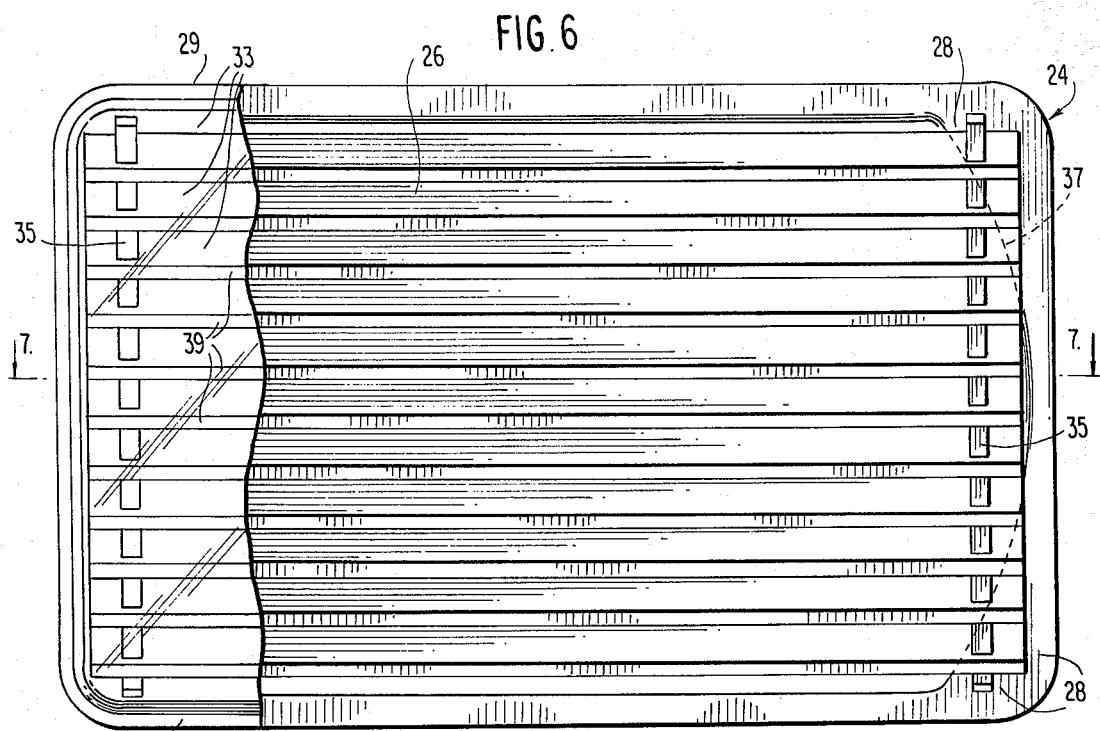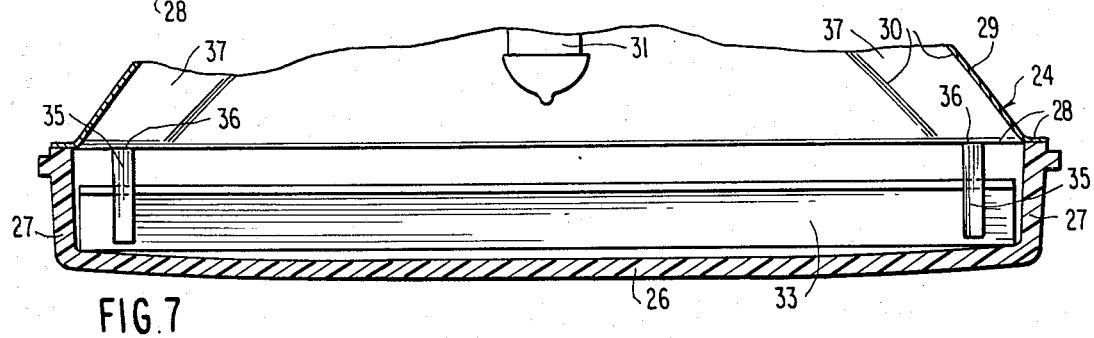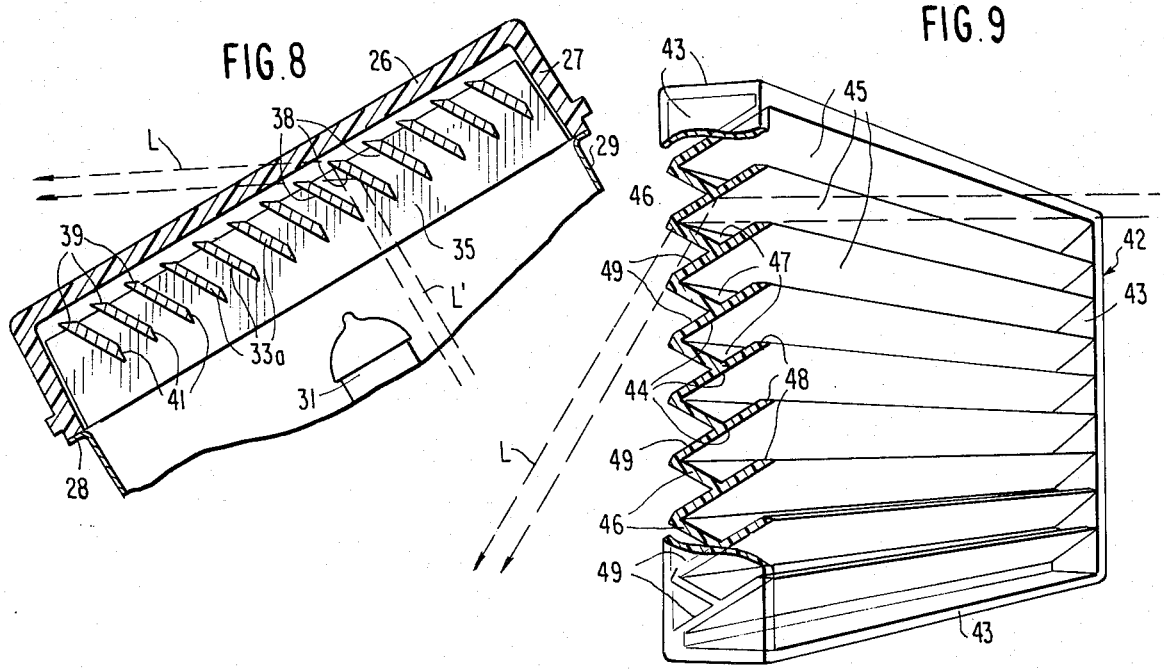

HEADLIGHTS FOR STREAMLINED VEHICLES

BACKGROUND OF THE INVENTION

The present trend in automotive design places great emphasis on streamlining to lessen wind resistance in order to improve fuel economy and reduce wind noise. The very latest vehicles reflect this trend in such details as redesigned or eliminated window and body moldings, flush or recessed door handles and relatively flat wheel covers.

In spite of these improvements, most automobiles continue to have fixed headlights whose lenses are vertical or substantially vertical and usually the headlights are recessed into the front quarter panels of the vehicle, making deep pockets which capture the wind and offer maximum resistance to air flow. Automotive disigners are well aware of this serious defect which mitigates against their current efforts to produce vehicle bodies which are "slippery" in relation to the air flowing over them. There simply has been no economically satisfactory or practical solution to the headlight problem, particularly on the less expensive high production models of automobiles.

As a result, the problem has been largely ignored except on a relatively few higher priced automobiles where power-operated tiltable headlights have been devised which are moved between inclined non-use or daylight positions to vertical use or nighttime positions. Such movable headlights require separate motors to operate and are therefore very expensive. They accomplish the purpose of reducing wind resistance only when in the inclined non-use position, and not when in the upright use position.

In other cases, deeply recessed headlights having vertical lenses are used in conjunction with long fixed auxiliary lenses which are formed to match the contours of the streamlined body front quarter panels. These long inclined auxiliary lenses are not only costly but tend to introduce optical problems into the illumination system including problems of reflection and refraction of light delivered by the headlights.

With all of the above in view, the present invention has for its objective the provision of headlights for automotive vehicles which, by the use of economical and practical means, can be built into the vehicle body in fixed positions whereby the lenses of the headlights are substantially flush with and parallel to the adjacent inclined and streamlined body surfaces so as to assist in implementing the overall "slipperiness" of the body design, and not create excessive wind resistance as now occurs with conventional headlights.

A further and more specific object of the invention is to provide a vehicle headlight of the above type and for the above purpose having a built-in light ray deflecting means whereby the light produced by the headlight is properly directed on the roadway in accordance with legal requirements governing pattern and intensity of illumination even when the optical axis of the headlight is steeply inclined from the usual nearly horizontal axis of conventional headlights.

Another object of the invention is to provide a fixed position headlight for streamlined vehicles having a large range of usefulness, in relation to the rather wide variations in the degrees of slope on the hoods and quarter panels of some modern-day vehicles.

Still another object is to provide a fixed position headlight for streamlined vehicles possessing built-in light beam deflection means in the form of a plurality of opaque slats having light reflecting surfaces.

Other features and advantages of the invention will become apparent to those skilled in the art during the course of the following description.

BRIEF DESCRIPTION OF THE DRAWINGS

FIGS. 1 and 2 are perspective views of headlights for streamlined vehicles according to the prior art.

FIG. 3 is a fragmentary side elevation of a headlight for a streamlined vehicle according to the invention.

FIG. 4 is an enlarged central vertical section through the headlight shown in FIG. 3.

FIG. 5 is an enlarged transverse vertical section through a reflective slat.

FIG. 6 is an elevational view of the headlight according to the invention taken on line 6—6 of FIG. 4, partly broken away.

FIG. 7 is a fragmentary section taken on line 7—7 of FIG. 6.

FIG. 8 is a fragmentary section similar to FIG. 4 showing a modification.

FIG. 9 is a perspective view, partly broken away and partly in section, of a headlight reflecting unit according to a second modification of the invention.

DETAILED DESCRIPTION

Referring to the drawings in detail wherein like numerals designate like parts, FIGS. 1 and 2 show two examples of prior art headlights for streamlined vehicles, both of which arrangements are costly. In FIG. 1, headlights 20 having vertical lenses are deeply recessed into vehicle front quarter panels 21. Long forwardly tapering fixed clear auxiliary lenses 22 are placed forwardly of the headlights within notches provided in the front quarter panels 21. The auxiliary lenses 22 conform to the hood and quarter panel configurations of the streamlined vehicle body but are costly and introduce optical error in the light beams delivered by the headlights 20.

FIG. 2, also showing the prior art, contains motor driven headlights 23 which are shown in their operating positions with their lenses vertically disposed and projecting above the vehicle hood and quarter panels, where they offer serious wind resistance. The lights 23, when rotated downwardly to daytime non-use positions, blend nicely into the streamlined contour of the vehicle body. A separate drive motor is required for each headlight 23, and therefore the arrangement is very costly. It also fails to completely solve the problem, as noted above. There are a number of similar prior art arrangements which do not completely solve the problem of headlight wind resistance in a practical and satisfactory manner, as does the present invention.

The invention as shown in FIGS. 3 to 9, comprises placing a fixed headlight 24 according to the invention in a provided well in each front quarter panel 25 of the vehicle. As shown in FIG. 3, the degree of taper at the front of the vehicle body can be quite pronounced, such as 30° or less below the horizontal. The degree of taper or streamlining of the vehicle will vary from make-to-make and model-to-model. The headlight according to the invention has a range of usefulness in this connection of approximately 20° to 50°, referring to the angle of slope of the hood and quarter panels below the horizontal.

The headlight 24 is fixed to the customary support bracket means, not shown, at an elevation below the hood and quarter panel line of the vehicle body. The details of this bracket structure will also vary from make-to-make of automotive vehicle. As is well known, the support bracket structure includes means for aiming or adjusting the headlight beam angle, as required by law, to a small angle below the horizontal, such as 2½° as indicated in FIG. 4.

The headlight 24, as shown in the drawings, is a standard rectangular headlights having a front substantially flat rectangular lens 26 preferably formed of an optically clear plastics material. The lens has customary ribbing or other protrusions on its front portion to create the required illumination pattern and distribution. This forms no part of the invention.

The lens 26 has comparatively short side wall portions 27 around its four sides whose edges abut and are fixed, preferably by adhesive means, to a narrow marginal flange 28 on the forward end of a headlight reflector 29 having a parabolic rear portion 30.

The illustrated headlight 24 is a halogen headlight containing a replaceable halogen light bulb 31 held by a releasable holder or bracket 32 of conventional construction at the rear of the headlight reflector. The invention is also applicable to incandescent headlights having removable or sealed beam light sources, and the invention is applicable to sealed beam halogen headlights. In fact, the invention is not dependent on any particular illumination source, and is fully compatible with all known types of modern-day headlights.

As shown in FIGS. 3 and 4, the headlight 24 is fixedly mounted with its optical axis essentially normal to the slope line of the vehicle hood and front quarter panels, which slope will vary in degree from vehicle-to-vehicle, as explained previously.

The essence of the invention resides in a built-in fixed angle light beam deflector or reflecting system, shown in a preferred form in FIGS. 3 through 7. In these figures, a plurality of equidistantly spaced parallel opaque reflecting strips 33, preferably formed of plastics material, are held fixedly in grooves 34 formed in a pair of spaced parallel side support bars 35 disposed near and inwardly of the opposite side wall portions 27 of the lens 26. The reflecting strips 33 can be held in the grooves 34 snugly, as by friction, and if preferred, may be held therein by adhesive means. The rear longitudinal edges 36 of the bars 35 extend rearwardly of the strips 33 and terminate at the marginal flange 28. As best shown in FIG. 6, the opposite ends of the bars 35 rest on corner areas of the reflector 29, outwardly of its curved side wall portions 37. As best shown in FIG. 7, the reflecting assembly composed of the support bars 35 and reflecting strips 33 is held in place snugly in sandwhiched relationship between the four corners of lens 26 and the opposing corner areas of the reflector 29. No additional fastening means for the reflecting system is required, and the system is permanently locked in place within the headlight.

The strips 33 are all positioned at the required angle to the optical axis of the headlight 24 to cause the light beam L generated by the headlight to be directed forwardly of the vehicle in the proper direction and with the required intensity of illumination and continuity to meet State and Federal requirements. The angle of mounting of the reflecting strips 33 will therefore be varied from make-to-make and model-to-model of vehicle, depending upon the degree of slope of its hood and front quarter panels.

The arrangement depicted in FIGS. 3 and 4 is for a vehicle whose hood and quarter panels are inclined approximately 30° below the horizontal. The reflective lower surfaces 38 of the strips 33 formed by a reflective coating are disposed at a similar angle of approximately 30° to the optical axis of the fixed headlight 24.

The frontal edges 39 of the reflecting strips 33 are all beveled in parallel relationship on an angle which is parallel to the desired angle of the light beam L, FIG. 4. The spacing of the strips 33, their angles, their front-to-back widths and their beveled edges 39 all cooperate to cause light reflected forwardly by the parabolic reflector 30 to be again reflected by the lower surfaces 38 of strips 33 to produce the required light beam L. A portion of the headlight beam is reflected forwardly through the slit or space defined between the parallel bevelled edges 39 of each adjacent pair of opaque strips 33. The rear faces 40 of these strips are colored to match the color of the vehicle paint or, in other cases, are made black. When the strips 33 are formed of plastics material, they can be pigmented as desired. The reflective coating for the strip faces 38 is conventional.

Once the headlight 24 is installed and properly adjusted in its mounting bracket means, it normally requires no further attention and functions like a conventional fixed headlight in spite of the fact that its optical axis is substantially normal to the sloping quarter panels and hood of the vehicle. The arrangement imparts the desired streamlining to the vehicle body at the two headlight areas while furnishing the required roadway illumination. No moving parts are involved and no elongated auxiliary lenses of the type shown in FIG. 1 are present. The advantage of the arrangement should be readily apparent to those skilled in the art. The beveled edges 39 preferably project somewhat forwardly of the leading edges of the two bars 35 as shown in FIG. 4 and are spaced slightly rearwardly of the frontal portion of lens 26.

In a modified form of the invention shown in FIG. 8, the spaced light reflecting strips or slats 33a are beveled at 41 on their inner longitudinal edges as well as at 39 on their leading edges, as previously described. The beveled edges 41 are parallel to each other and parallel to the optical axis of the headlight. A greater passageway for light L' parallel to the axis of the headlight is provided, although a greater number of the strips 33a is necessary. In all other respects, the headlight in FIG. 8 is constructed and operates in the same manner described in the preceding embodiment.

FIG. 9 depicts another embodiment of the light deflecting means for a fixed inclined axis headlight on a streamlined automobile. In lieu of the assembly including plural strips 33 held in slots of the support bars 35, a molded unitized optical plastics light deflector 42 is provided for placement between the headlight lens 26 and corner areas of the light reflector 29, as previously described, without any additional fastener means. The deflector unit 42 includes a marginal rectangular frame 43 within which are held in parallel equidistantly spaced relationship inclined strips or slats 44 corresponding to the strips 33 and having light reflecting coating on their corresponding lower faces 45. The slats 44 are joined integrally by webs 46 which are light transmitting, and whose faces 47 are perpendicular to the light rays reflected by the surfaces 45. The inner edges of the slats or strips 45 are beveled at 48, corresponding to the previously-described beveled edges 41. The slat surfaces 49 below the webs 47 are either colored black or are colored to match the paint of the automotive vehicle. These surfaces are opaque.

The deflector unit 42 of FIG. 9 functions in the headlight in the identical manner described with respect to the prior embodiments. The advantage inherent in the unit 42 is that the necessity for assembling the several strips or slats 33 with the support bars 35 is obviated.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the inention claimed.

I claim:

1. A headlight for streamlined vehicles comprising in combination a sloping upper forward vehicle surface sloping forwardly and downwardly at an acute angle to the horizontal, a headlight reflector body portion including an internal illumination source and a frontal lens secured to the reflector body portion, the headlight being mounted with its optical axis substantially normal to said sloping surface and said frontal lens substantially flush therewith, and light deflector means held within the headlight rearwardly of the frontal lens and deflecting light rays from the optical axis of the headlight through the frontal lens and onto a roadway ahead of the vehicle on which the headlight is mounted at a required angle near the horizontal and in a required light pattern with proper light intensity.

2. A headlight for streamlined vehicles as defined in claim 1, and said light deflector means including a plurality of spaced parallel slats disposed at a fixed angle of inclination to said optical axis and having corresponding lower side light reflecting surfaces.

3. A headlight for streamlined vehicles as defined in claim 2, and said slats having corresponding beveled parallel frontal edges defining pathways for light reflected by said reflecting surfaces toward a roadway surface.

4. A headlight for streamlined vehicles as defined in claim 2, and means forming a support for the plurality of spaced parallel slats within the headlight and being held between said lens and an opposing surface of said reflector body portion.

5. A headlight for streamlined vehicles as defined in claim 4, and said means and slats comprising an integrally molded light deflector unit held between said lens and said opposing surface of the reflector body portion.

6. In a streamlined vehicle having a sloping upper frontal surface, a headlight mounted on the vehicle adjacent to the sloping surface and having its optical axis substantially normal to the sloping surface, the headlight being substantially fixed relative to the sloping surface and having a frontal lens near and substantially parallel to the sloping surface, and fixed angle light deflector means within the headlight near said lens for directing light from the headlight onto a roadway ahead of a vehicle on which the headlight is mounted.

7. In a streamlined vehicle as defined in claim 6, and said light deflector means comprising a light deflector unit including a plurality of spaced parallel light deflector slats held in fixed relationship between the headlight lens and an opposing flange of the reflector body portion of the headlight, said slats being disposed at a fixed angle of inclination to the optical axis of the headlight defined by its reflector body portion.

8. In a streamlined vehicle as defined in claim 7, and said slats having corresponding light reflecting surfaces which deflect light from the optical axis of the headlight forwardly and downwardly onto a roadway ahead of the vehicle.

9. In a streamlined vehicle as defined in claim 8, and said slats being formed of substantially opaque material.

10. A headlight for streamlined vehicles as defined in claim 5, and said integrally molded light deflector unit being formed of opaque plastics material.

11. A headlight adapted for mounting on a streamlined vehicle having a sloping fontal surface sloping downwardly and forwardly at an acute angle to the horizontal, the headlight comprising a reflector body portion containing an illumination source and having a frontal marginal flange, said headlight having an optical axis substantially normal to the sloping surface, a frontal lens abutting and fixed to said flange, and a light deflector unit clampingly held between said lens and flange and including a plurality of substantially equidistantly spaced parallel fixed inclined axis deflector slats having lower side light reflecting surfaces, said slats being inclined relative to the normal optical axis of the headlight.

12. A headlight as defined in claim 11, and said reflector body portion being at least in part substantially parabolic, and said illumination source comprising a replaceable light bulb at the center of the reflector body portion and rearwardly of the light deflector unit.

13. A headlight for streamlined vehicles as defined in claim 3, and said slats having corresponding beveled parallel rear edges which are convergent with the beveled frontal edges and are parallel to the normal optical axis of the headlight.

14. A headlight for streamlined vehicles as defined in claim 5, and said molded unit including light transmitting webs connected between said slats at an angle to the slats which is normal to the axis of light reflected from the slats.

15. A headlight for streamlined vehicles as defined in claim 14, and said webs extending from longitudinal edges of the slats to points near the transverse centers of the slats.

* * * * *